M. H. CLEAVER.
COMBINED NON-SKID AND TRACTION DEVICE FOR DUAL TIRED WHEELS.
APPLICATION FILED DEC. 21, 1914.
1,160,577.
Patented Nov. 16, 1915.
2 SHEETS—SHEET 1.
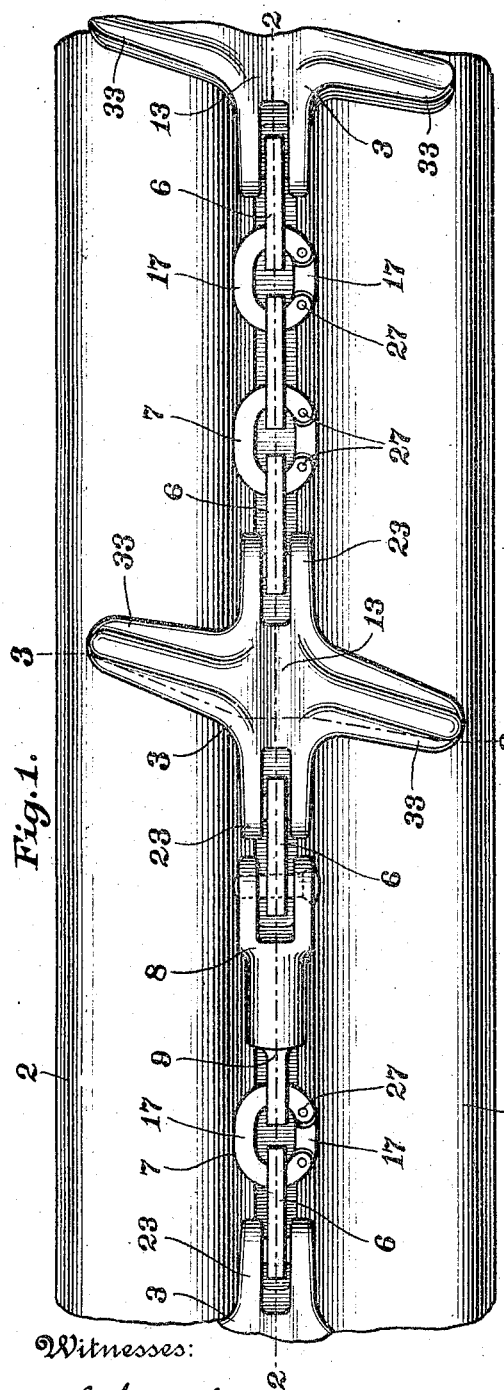
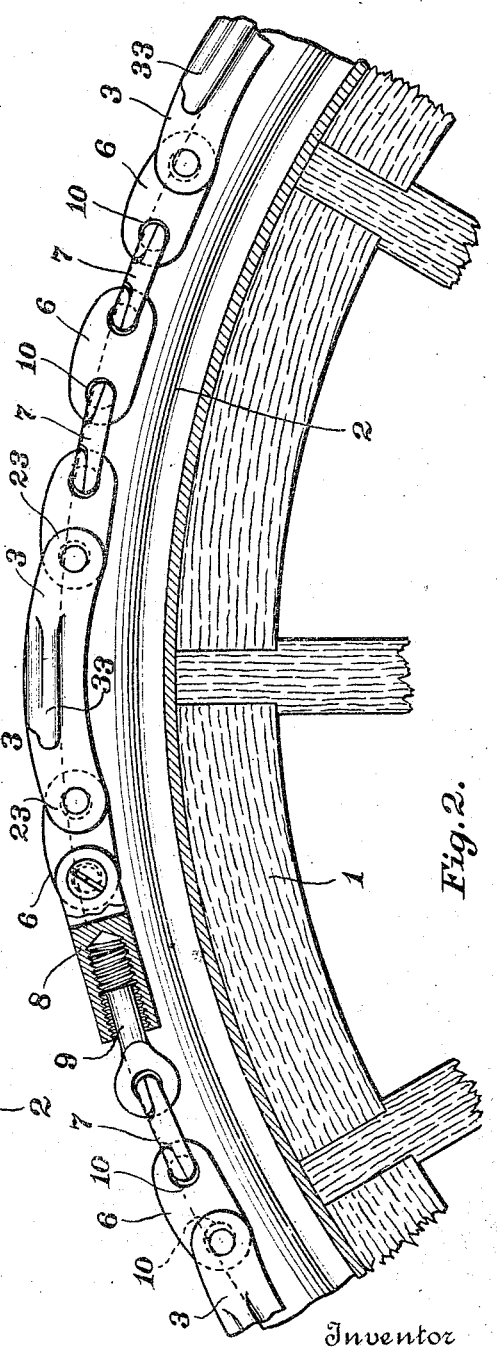

M. H. CLEAVER.
COMBINED NON-SKID AND TRACTION DEVICE FOR DUAL TIRED WHEELS.
APPLICATION FILED DEC. 21, 1914.
1,160,577.
Patented Nov. 16, 1915.
2 SHEETS—SHEET 2.
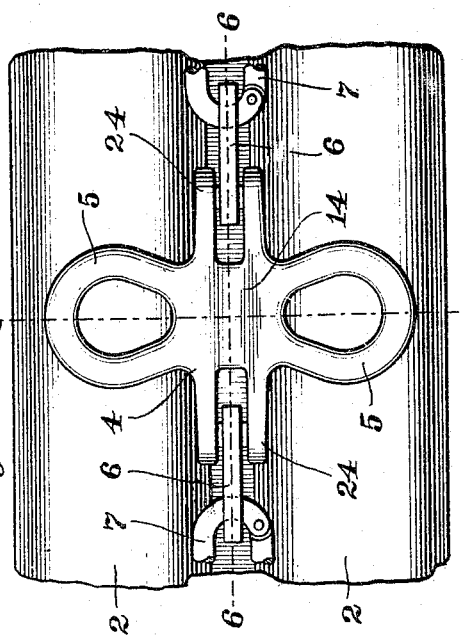
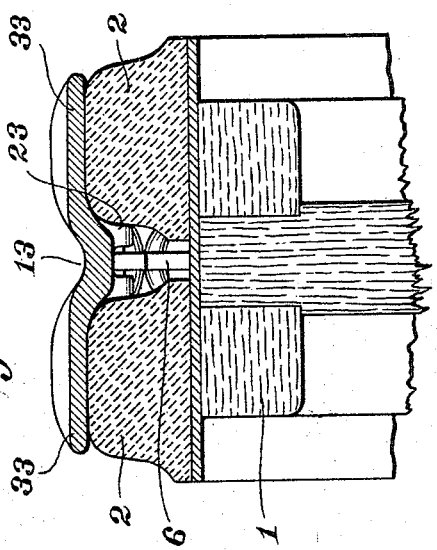

UNITED STATES PATENT OFFICE.

MONTAGUE H. CLEAVER, OF NEW YORK, N. Y., ASSIGNOR TO NEVERSKID MANUFACTURING CO., INCORPORATED, A CORPORATION OF NEW YORK.

COMBINED NON-SKID AND TRACTION DEVICE FOR DUAL-TIRED WHEELS.

1,160,577. Specification of Letters Patent. Patented Nov. 16, 1915.

Application filed December 21, 1914. Serial No. 878,439.

*To all whom it may concern:*

Be it known that I, MONTAGUE H. CLEAVER, a subject of the King of Great Britain, residing at New York city, county and State of New York, have invented certain new and useful Improvements in Combined Non-Skid and Traction Devices for Dual-Tired Wheels, of which the following is a specification.

My invention relates to non-skid and traction devices for vehicles such as heavy motor trucks having wheels provided with dual elastic tires, and has for its object the production of a device of this character which will not slip on the surface of the tires, will be durable and not subject to deformation in use and which will produce only a minimum of uneven or chattering action when the vehicle provided with the device runs over a solid pavement.

The best form of apparatus at present known to me embodying my invention is illustrated in the accompanying two sheets of drawings in which, Figure 1 is a plan view of a section of the wheel face with one form of my invention applied thereto. Fig. 2 is a vertical section of the wheel taken on line 2—2 of Fig. 1, the non-skid device being shown in full lines, with parts broken away. Fig. 3 is a cross section taken on the irregular line 3—3 of Fig. 1. Fig. 4 is a plan view of a portion of the wheel rim with a modified form of my invention. Fig. 5 is a cross section taken on line 5—5 of Fig. 4, and Fig. 6 is a vertical section of the wheel taken on the line 6—6 of Fig. 4 with the non-skid device shown in full lines.

Throughout the drawings like reference characters indicate like parts.

1, is the wheel provided with dual elastic tires 2, 2, usually made of hard rubber.

The non-skid device consists of a series of shoes held together by flexible chains and having extensions or wings, which overlie the faces of the elastic tires, the connecting chains lying in the groove between the tires.

In the form shown in Figs. 1, 2 and 3, the shoe 3, has diagonally extending wings 33, 33, which overlie the faces of the tires 2, 2. The central portion of the shoe has a depressed or grooved part 13, and projecting ears 23, 23, to which the chain sections may be connected. These chains consist of a series of flat links 6, 6, which I call plate links because they are formed out of plates of tough steel by punching out an opening or openings through which adjoining links may pass. The preferred form of such link is well illustrated in Fig. 2 where such link is shown with the outer edge slightly curved, and having holes 10, 10, punched, one near each end, through which the adjoining links may pass. As a result of this curvature the part 11, of the link projecting farthest from the wheels radially, and which will be most severely compressed when the link strikes the ground, is solid, and farthest removed from the holes 10, 10. This structure enables the plate link to resist the compression which it receives in use without splitting or crushing at the holes. With solid plate links of this character it is obviously necessary that the alternating links should have some kind of built-up construction so that these secondary links may be inserted through the openings in the solid links when the chain is being assembled. I prefer to employ the form of split link shown at 7, each one of which is composed of two C-shaped sections 17, 17, which are riveted together, some of the rivets being shown at 27.

The completed flexible structure forming the non-skid device composed of sections of chain and connected shoes may have its ends connected to form the endless loop for surrounding the wheel by means of the turn buckle 8, and screw 9, engaging adjacent links. This turn buckle may be screw threaded interiorly, as indicated by the broken away portion of Fig. 2, so that the structure may be tightened or loosened on the wheel as occasion may require.

While the form of shoe shown in Fig. 1 gives good results, I prefer, for city work, the form of shoe shown at 4, in Figs. 4, 5 and 6, in which the portions overlying the faces of the tires are loop shaped in the plane of the tire surfaces. These loop shaped sections are indicated at 5, 5. This shoe also has a central groove or depression marked 14, which is in line with the groove between the two tires 2, 2, and ears 24, 24, to which the chain sections may be connected.

In making up these devices, the split links 7, are of course made in two sections 17, 17, and then a pair of these links are hooked into two adjacent plate links and riveted together in the position shown in Figs. 1 and 2. The plate links at the end of each section are pivoted to the ears of the shoes, one or more turn buckles are inserted in proper positions and the whole flexible structure is fastened around the wheel with the chains lying in grooves between the dual tires.

The solid links or plate links 6, are always arranged parallel to the plane of the wheel so that they will receive any compression strains resulting from the compression of the chain between the wheel and the ground or pavement. The split link or other form of built-up link can be safely used to connect these solid links because said built-up links are arranged in planes at right angles to the plane of the wheel and they are never subjected to any compressive strains of any account, since they are protected by the solid links through which they pass.

As the result of the chain structure before described the chain is never subjected to deformation no matter how severe the usage to which the non-skid device is put. Ordinarily the great trouble has been that ordinary links of wrought iron have been used throughout in the manufacture of chains or devices of this character, and those links which were in planes parallel to the plane of the wheel were soon hammered between the solid rim of the wheel and the pavement or between these parts and intervening masses of solid matter, with the result that such links had their sides forced inwardly, and were correspondingly lengthened. This caused the chain device to be continually getting out of adjustment, if the links were not in fact weakened to the breaking point. If a driver started out with his chain correctly adjusted a few miles of hard running over solid roads would sometimes so lengthen the chain that it would drop off the wheel. The use of the solid plate links above described avoids this difficulty. In the same way, the making of the central portion of each shoe in the shape of a depressed groove reduces the liability of the shoes being hammered between the solid portion of the wheel rim between the tires and the pavement, or any projection from the pavement. It throws the entire weight upon the wings of the shoe which overlie the faces of the elastic tires so that the entire weight is carried where it should be carried, i. e. by said elastic tires.

The loop form of shoe shown in Fig. 4 has a particularly effective grip upon the elastic tire and is not liable to slip thereon. It is practically a skeleton shoe with the least amount of metal arranged in the form to give the most strength and tractive effort.

Having described my invention, I claim:

1. A non-skid and traction device for wheels provided with dual elastic tires having in combination a series of shoes to be held on and between said tires, and chains connecting said shoes comprising a series of plate links arranged parallel to the plane of the wheel, alternating with links of built-up construction.

2. A non-skid and traction device for wheels provided with dual elastic tires having in combination a series of shoes to be held on and between said tires, and chains connecting said shoes comprising a series of links each composed of a flat plate of metal having a hole near each end, alternating with links formed of two C-shaped portions riveted together.

3. A non-skid and traction device for wheels provided with dual elastice tires having in combination a series of shoes to be held on and between said tires, and chains connecting said shoes comprising a series of plate links arranged parallel to the plane of the wheel, and lying in the groove between the dual tires, said links having holes therethrough and an outer contour such that the portion of each link projecting farthest in a direction radial to the wheel is out of line with said holes.

MONTAGUE H. CLEAVER.

Witnesses:
A. PARKER-SMITH,
M. G. CRAWFORD.

Copies of this patent may be obtained for five cents each, by addressing the "Commissioner of Patents, Washington, D. C."